United States Patent
Morich et al.

(10) Patent No.: US 8,676,959 B2
(45) Date of Patent: Mar. 18, 2014

(54) INTEGRATED HEARTBEAT MONITORING AND FAILOVER HANDLING FOR HIGH AVAILABILITY

(75) Inventors: Kai Morich, Hockenheim (DE); Michael R. Schmalzl, Stuttgart (DE)

(73) Assignee: SAP AG, Walldorf (DE)

( * ) Notice: Subject to any disclaimer, the term of this patent is extended or adjusted under 35 U.S.C. 154(b) by 1600 days.

(21) Appl. No.: 11/390,610

(22) Filed: Mar. 27, 2006

(65) Prior Publication Data
US 2007/0226333 A1    Sep. 27, 2007

(51) Int. Cl.
G06F 15/173    (2006.01)

(52) U.S. Cl.
USPC ............................ 709/224; 714/4.1; 714/4.11

(58) Field of Classification Search
USPC ......... 709/217–219, 224, 226–227, 229, 239; 714/4, 15, 47–48
See application file for complete search history.

(56) References Cited

U.S. PATENT DOCUMENTS

| | | | | |
|---|---|---|---|---|
| 5,805,785 A * | 9/1998 | Dias et al. | | 714/4 |
| 6,014,686 A * | 1/2000 | Elnozahy et al. | | 709/202 |
| 6,266,781 B1 * | 7/2001 | Chung et al. | | 714/4.1 |
| 6,363,497 B1 * | 3/2002 | Chrabaszcz | | 714/13 |
| 6,854,069 B2 * | 2/2005 | Kampe et al. | | 714/4.12 |
| 2002/0147810 A1* | 10/2002 | Traversat et al. | | 709/224 |

* cited by examiner

*Primary Examiner* — Thomas Dailey
*Assistant Examiner* — Nam Tran
(74) *Attorney, Agent, or Firm* — Mintz, Levin, Cohn, Ferris, Glovsky and Popeo, P.C.

(57) ABSTRACT

A computing system method for high-availability operation is disclosed. Implementations of the system include a plurality of host computers connected together in a network, each host computer running an HA process to monitor activity on the host computer. The system further includes a master HA process, designated from all other HA processes running on the plurality of host computers. The master HA process includes a heartbeat monitor to monitor activity of the network to detect a failed host computer, and a failover handler to transfer at least one of the one or more tasks from the failed host computer to an active host computer. All other HA processes other than the master HA process are used as cache for read requests to topology data.

13 Claims, 5 Drawing Sheets

INTEGRATED HEARTBEAT MONITORING AND FAILOVER HANDLING FOR HIGH AVAILABILITY

BACKGROUND

A computing infrastructure can include a set of host computers (or "hosts") on which tasks of an application are distributed and performed. To achieve high availability requirements, the computing infrastructure needs to be able to automatically switch a task among hosts in case one host suffers hardware or software problems. To implement such automatic switching, the computing infrastructure needs a heartbeat monitoring mechanism that monitors the health of each host to detect if a host is "down" or not functioning properly. The computing infrastructure further requires a failover handling mechanism that moves the workload of a task from a downed host to a backup host.

The heartbeat monitoring and failover handling mechanisms for achieving high availability can be implemented externally from an application to be monitored, or as an integral part of the application. As an external application, the computing infrastructure typically does not use normal network communications, but checks for hardware and software availability. In case of host failures, the IP address is switched to the backup host. However, merely switching IP addresses is not sufficient for stateful applications, where the session-specific and dynamically updated landscape information that defined the states would have to be switched too. An integrated mechanism can access and evaluate such information and handle failover accordingly. Additionally the tasks on the backup host must be started or at least activated. Such activity is more costly and complex for an external mechanism than for an integrated one.

SUMMARY

In general, this document discusses a system and method for integrated heartbeat monitoring and failover handling for a high-availability computing infrastructure.

According to an aspect, the integrated heartbeat monitoring and failover handling are an integral part of the application to be monitored, and are configured to handle application states correctly and to take appropriate action when switching a task from a master host to a backup host. This approach avoids the costs and complexity that would be caused by installing and configuring these features externally.

According to another aspect, the integrated high-availability computing infrastructure includes many features to prevent false alarms that could arise because the same TCP/IP based network is used for ordinary communication and high-availability monitoring.

In one aspect, a computing system for high-availability operation includes a plurality of host computers connected together in a network. Each host computer executes one or more tasks of a distributed application in one or more processes. The system further includes a process that in SAP NETWEAVER™ is called a NameServer process running on each of the plurality of host computers, where the NameServer process includes a High-Availability (HA) process, that is the main subject of this disclosure. Each HA process includes a heartbeat monitor to detect a failed process on the host computer, and a failover handler to transfer at least one of the one or more tasks from the failed process to a new process on the host computer.

In another aspect, a computing system for high-availability operation includes a plurality of host computers connected together in a network, each host computer running an HA process to monitor activity on the host computer. The system further includes a master HA process, designated from among all the HA processes running on the plurality of host computers. The master HA process includes a heartbeat monitor to monitor other hosts and to detect a failed host computer, and a failover handler to transfer at least one of the one or more tasks from the failed host computer to an active host computer. Some HA processes on other hosts are designated as potential master HA processes and monitor the currently designated master HA process. If they detect that the current master HA process has failed, they designate a new master HA process.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
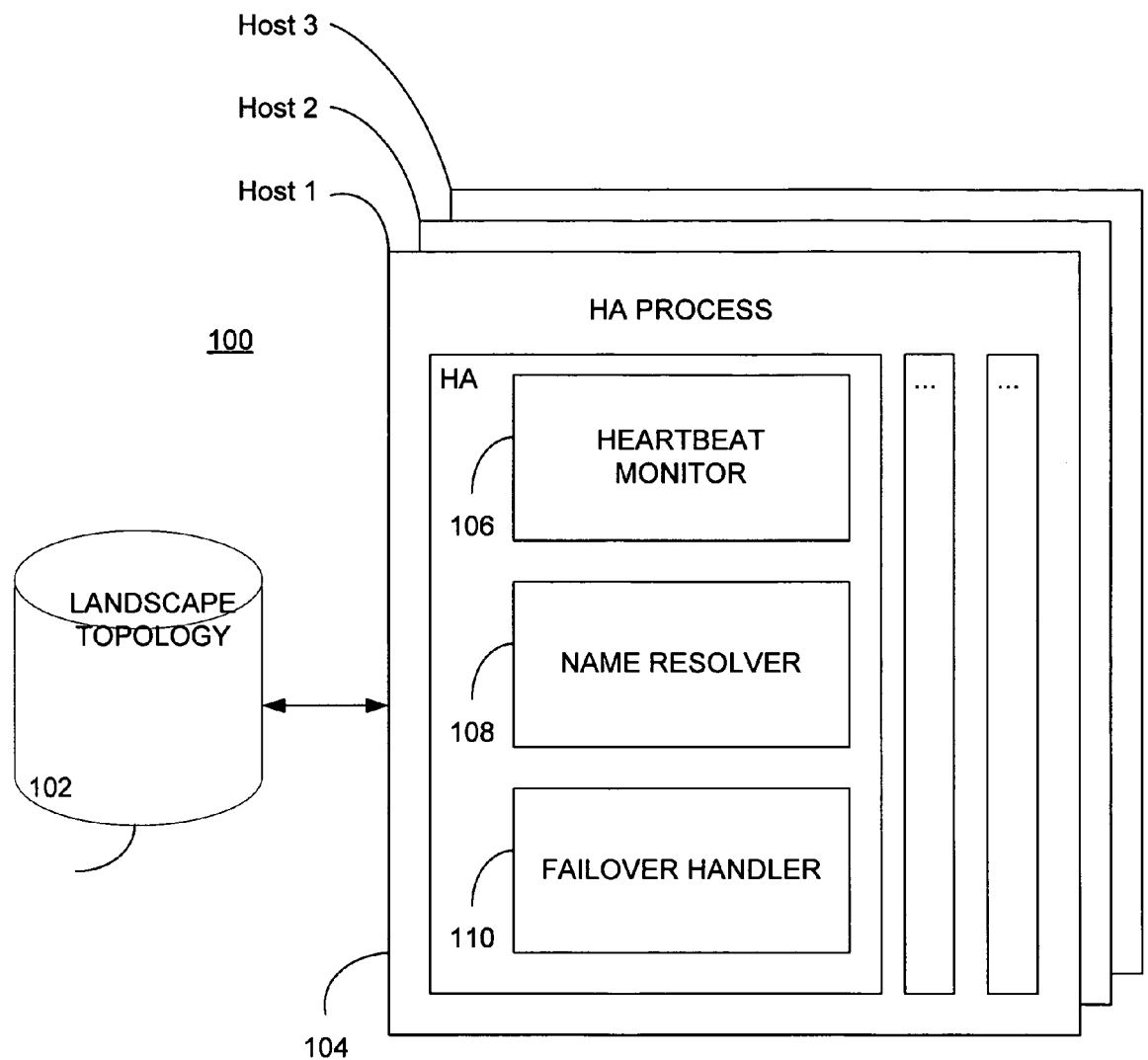
FIG. 1 is a block diagram of a computing infrastructure for high availability operations.

This document describes a computing infrastructure for use with a multi-host computing system, where the computing infrastructure has integrated heartbeat monitoring and failover handling for high availability operations. FIG. 1 illustrates an exemplary embodiment of such a computing infrastructure 100. The computing infrastructure 100 includes a central directory 102 that contains the landscape topology. The landscape topology specifies which host supports any particular application. The central directory 102 contains information about all hosts, their states, and which applications are currently active, and is further configured to specify the landscape topology of the computing system.

In accordance with a preferred exemplary embodiment, the computing infrastructure includes a high availability (HA) process 104, a process that combines a heartbeat monitor 106, a name resolver 108, and failover handler 110 and other functions that do not relate to this disclosure. The tasks of each of these modules is described further below. On each host there is one HA process 104 running, while the application runs in other processes. To ensure a consistent state, a single HA process 104 is designated to modify the landscape topology.

To ensure that the HA process 104 also offers high availability, instead of having one predefined host that runs the master HA process 104, a list is maintained of hosts that can be the master. The list is configurable in runtime. At any given time, only one of the listed HA processes 104 is master. All other instances of the HA process 104 are used as cache for faster read requests to the topology data. All write requests are forwarded to the active master HA process 104. Configuring the list of potential master HA process hosts in runtime simplifies administration. As an example, if only three out of 20 hosts can be a master, at least one of these hosts must be running. However, if all hosts may be master, it is not evident whether an arbitrary host can be shut down.

Heartbeat Monitoring

Figure 3:
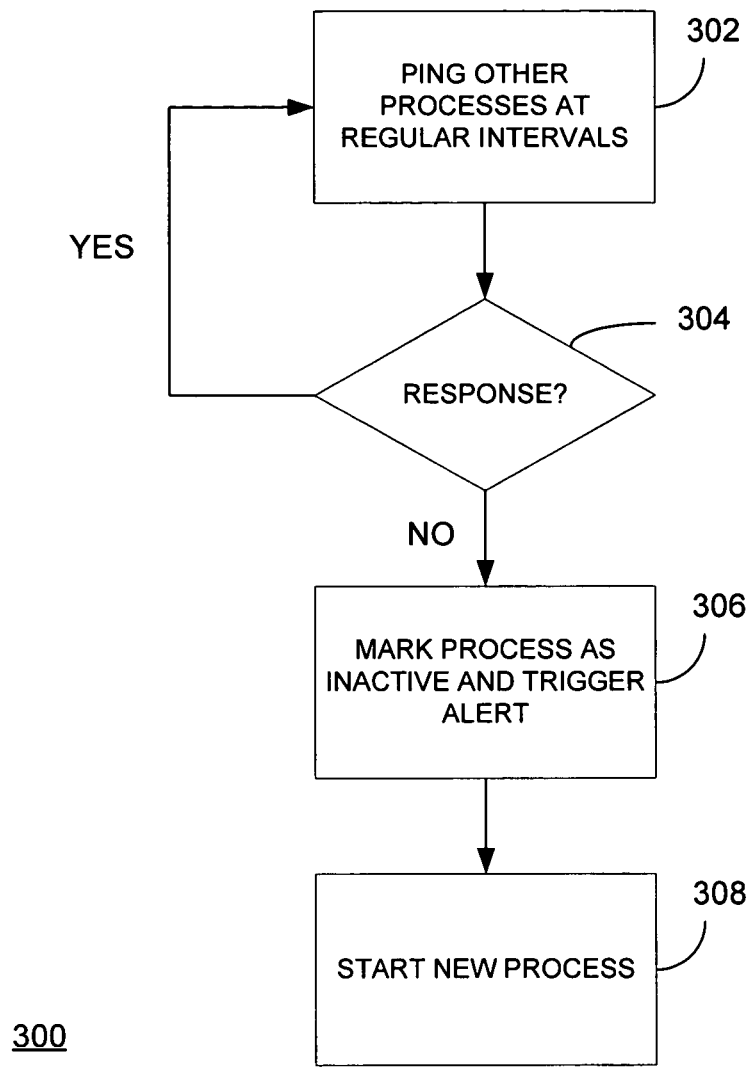
FIG. 3 illustrates an intra-host heartbeat monitoring process.
Figure 4:
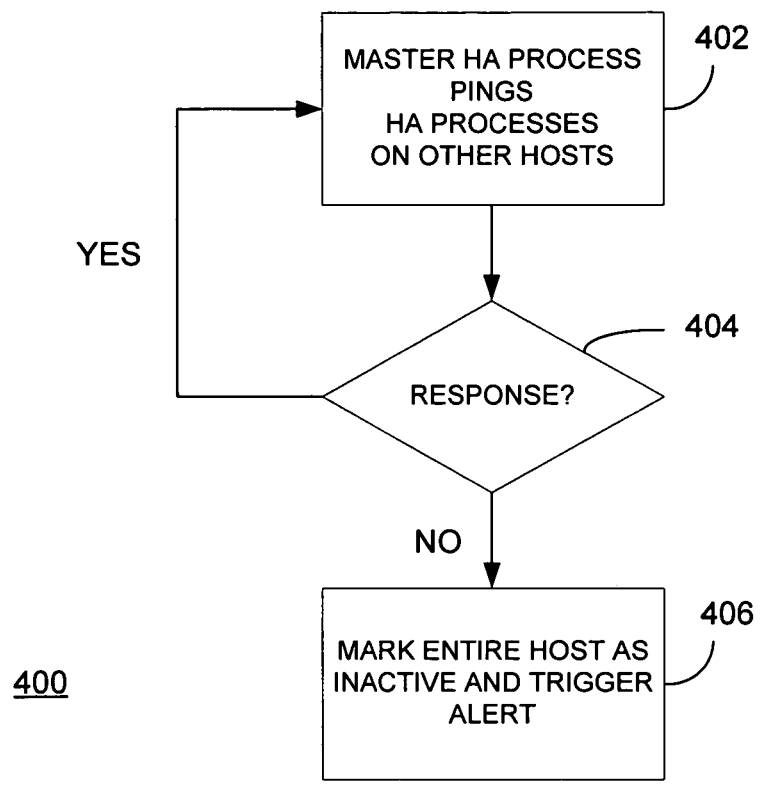
FIG. 4 illustrates an inter-host heartbeat monitoring process.
Figure 5:
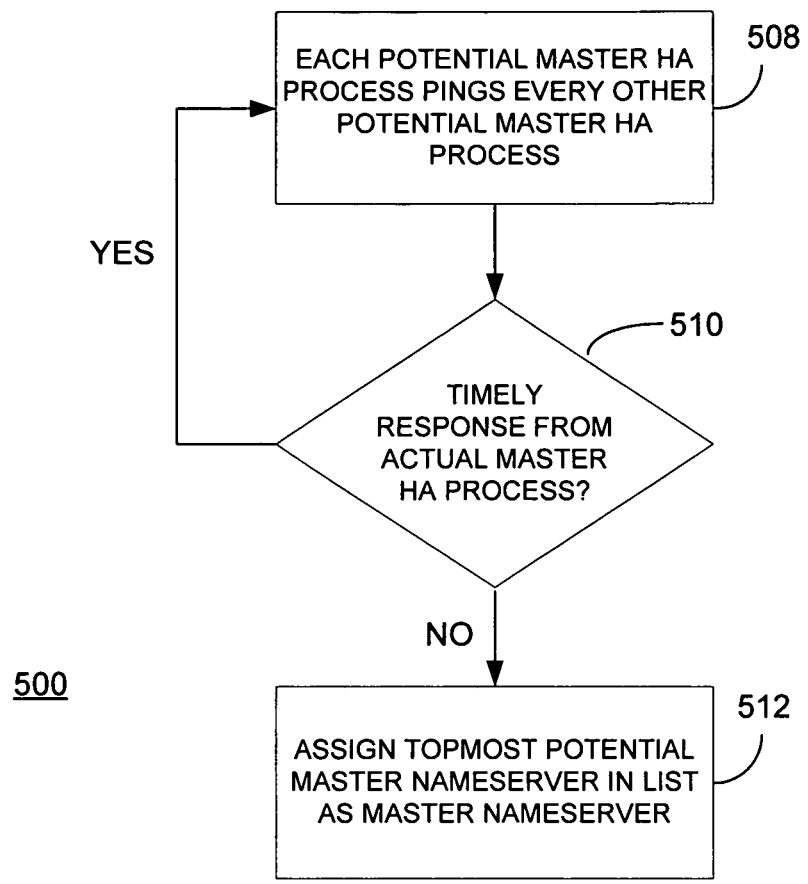
FIG. 5 illustrates a master HA heartbeat process.

The heartbeat monitor 106 performs heartbeat monitoring functionality, which is divided into two parts: intra-host heartbeat monitoring 300 and inter-host heartbeat monitoring 400, as shown in FIGS. 3, 4 and 5 respectively. For intra-host heartbeat monitoring, the HA process pings other processes on the host at regular intervals at 302 (such as every few seconds), and awaits a response at 304. If a process does not respond within a preset time, that process is marked as "inactive," and an alert is triggered. Optionally, a new process can be started to replace the missing process.

The inter-host heartbeat is again divided into to parts: inter-host heartbeat and master nameserver heartbeat. For inter-host heartbeat monitoring (FIG. 4), the active master HA process pings only the HA processes on the other hosts at 402. If there is no response from a host (404), the entire host is marked as "inactive" and an alert is triggered at 406.

To detect the failure of the active master HA process (FIG. 5), each potential master HA process pings every other potential master HA process at 508. If there is no response from the active master HA process within a given time (510), the topmost master HA process in the list of potential master HA processes assigns itself as master 512.

Figure 2:
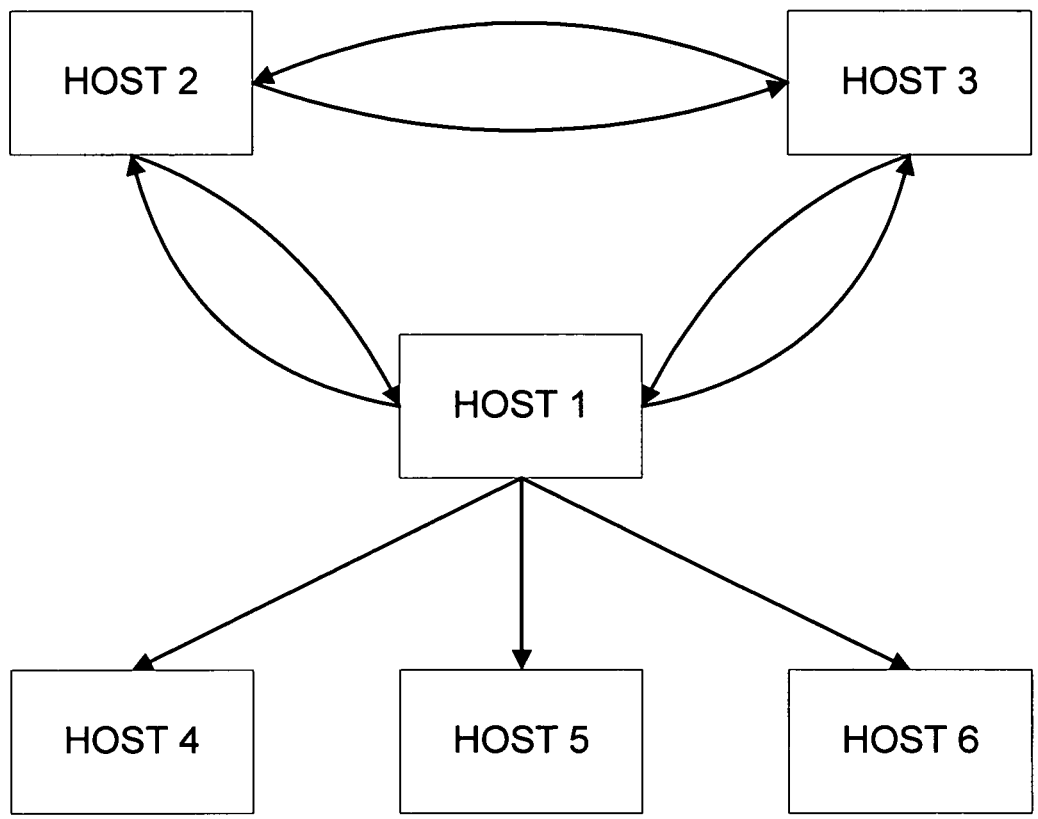
FIG. 2 is a block diagram of a computing system to execute a distributed application.

For example, in a landscape with six hosts, where hosts 1-3 run potential master HA processes and host 1 runs the active master HA process, FIG. 2 illustrates the inter-machine heartbeat pings that are sent. The outward arrows from host 1 are illustrated in FIG. 4, while the arrows between hosts 1, 2, and 3 are illustrated in FIG. 5.

Name Resolution

The name resolver 108 performs name resolution, which is applied to many different entities, including tables. The landscape topology specifies which host is responsible for each entity. When an application starts, it connects to the HA process 104, and receives from the HA process 104 a list of all the entities for which the application is responsible. When the application terminates, it disconnects from the HA process 104, and informs the HA process 104 that these entities are no longer assigned.

Whenever a client wants to talk to a specific entity, it must first ask the HA process 104 where the entity is located, and then the client can connect to the correct host. Since there is an instance of the HA process 104 running on each host, the name resolution calls are handled locally, which increases the performance.

Failover Handling

When the failover handler 110 in the master HA process 104 detects that a host is not available, the application on another host is called with a list of entities (i.e. other hosts) for which it should become responsible. If and when the original host becomes active again, it does not immediately get back the entities that have been assigned to the other host. To ensure a more even load distribution, the entities are moved back to the original host only after it has been active for a certain period of time.

A prerequisite for failover handling is that all the persistent data used by the application is stored at a central location such as a database or a file server configured to offer high-availability. This is necessary to ensure that another host can easily take over an entity.

To prevent unnecessary failovers, the HA process 104 has a thread that wakes up each second and compares the elapsed system time with the desired value of one second. If the elapsed time is slightly longer (i.e. up to a few seconds), a high central processing unit (CPU) load is assumed and the intra-machine heartbeat interval is increased to prevent unnecessary failovers due to increased TCP/IP latency.

If the elapsed time differs from the desired value by a larger value, (e.g. +/−3600 seconds, such as due to daylight-saving time adjustment), the counter for the inter-machine heartbeat is reset. This prevents any incorrect failovers triggered by the apparent absence for 3600 seconds of a heartbeat.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computing system for high-availability operation, the computing system comprising:
   a plurality of host computers connected together in a network, each host computer executing one or more tasks of a distributed application; and
   a high-availability (HA) process running on each of the plurality of host computers, each HA process including:
      a heartbeat monitor configured to perform:
         intra-host heartbeat monitoring to detect inactivity of one or more intra-host processes, and
         inter-host heartbeat monitoring to monitor activity of the network and dynamically-updated, session-specific landscape information that relates to a state of the distributed application to detect a failed inter-host process or host computer, and
      a failover handler to transfer at least one of the one or more tasks from the failed inter-host process or host computer to an active inter-host process or host computer,
      each HA process further including a host name resolver to identify a host name of one or more of the plurality of host computers in the network,
   wherein one of the HA processes is designated as a master HA process;
   the host computer running the master HA process is included, along with one or more other host computers running HA processes designated as potential master HA processes, in a list of host computers configured to run the master HA process;
   the inter-host heartbeat monitoring comprises the heartbeat monitor of the master HA process performing a first pinging of the HA processes on host computers other than the host computer hosting the master HA process, the first pinging being performed to detect the failed inter-host process or host computer; and
   the inter-host heartbeat monitoring further comprises the heartbeat monitor of each potential master HA process performing a second pinging of all other potential master HA processes in the list and the master HA process, the second pinging being performed to detect a failure of the master HA process and determine which potential master HA process replaces the master HA process if the master HA process has failed.

2. A computing system in accordance with claim 1, further comprising a central directory that contains topology data about the network.

3. A computing system in accordance with claim 2, wherein the central directory further contains information about one or more states of each of the plurality of host computers in the network and information about which tasks are currently running on each of the plurality of host computers.

4. A computing system in accordance with claim 1, wherein cached local copies of each HA process, other than the master HA process, are used for read requests to the topology data.

5. A computing system in accordance with claim 1, wherein the at least one of the one or more transferred tasks are transferred back to the failed process or host computer from the active process or host computer when the failed process or host computer becomes active again and stays active for at least a predetermined amount of time.

6. A computing system in accordance with claim 1, wherein the distributed application includes the heartbeat monitor and the failover handler.

7. A computing system for high-availability operation, the computing system comprising:
   a plurality of host computers connected together in a network, each host computer executing one or more tasks of a distributed application and running a high-availability (HA) process that monitors activity on its host computer; and
   a master HA process running on one of the plurality of host computers and designated from among all the HA processes running on the plurality of host computers to be the master HA process, the master HA process including:
      a heartbeat monitor configured to monitor activity of the network to detect a failed inter-host process or host computer,
      a name resolver to identify a host name of one or more of the plurality of host computers in the network, and
      a failover handler to transfer at least one of the one or more tasks from a host computer detected to be inactive to an active host computer,
   the heartbeat monitor performing intra-host heartbeat monitoring to detect activity of one or more intra-host processes and inter-host heartbeat monitoring to detect activity of HA processes on one or more other host computers,
   the host computer running the master HA process is included, along with one or more other host computers running HA processes designated as potential master HA processes, in a list of host computers configured to run the master HA process;
   the inter-host heartbeat monitoring comprises the heartbeat monitor of the master HA process performing a first pinging of the HA processes on host computers other than the host computer hosting the master HA process, the first pinging being performed to detect the failed inter-host process or host computer; and
   the inter-host heartbeat monitoring further comprises the heartbeat monitor of each potential master HA process performing a second pinging of all other potential master HA processes in the list and the master HA process, the second pinging being performed to detect a failure of the master HA process and determine which potential master HA process replaces the master HA process if the master HA process has failed.

8. A computing system in accordance with claim 7, wherein each of the HA processes other than the master HA process includes a heartbeat monitor to monitor activity of its respective host computer to detect a failed process.

9. A computing system in accordance with claim 7, further comprising a central directory that contains topology data about the network.

10. A computing system in accordance with claim 9, wherein the central directory further contains information about one or more states of each of the plurality of host computers in the network and information about which tasks are currently running on each of the plurality of host computers.

11. A computing system in accordance with claim 9, wherein cached local copies each HA process other than the master HA process are used for read requests to the topology data.

12. A method for high-availability operation of a distributed application executed by a computing system having a plurality of host computers connected together in a network, the method comprising:
   providing an HA process on each host computer in the network, each HA process including:
      a heartbeat monitor performing intra-host heartbeat monitoring to detect activity of intra-host processes and inter-host heartbeat monitoring to detect activity of HA processes on one or more other host computers,
      a host name resolver to identify a host name of one or more of the plurality of host computers in the network;
   designating one HA process from among all the HA processes as a master HA process to monitor activity in the network based on input from all other HA processes;
   using all the HA processes other than the master HA process as cache for read operations;
   detecting, by the master HA process, a failed host computer; and
   transferring a task from the failed host computer to an active host computer in the network,
   the host computer running the master HA process is included, along with one or more other host computers running HA processes designated as potential master HA processes, in a list of host computers configured to run the master HA process;
   the inter-host heartbeat monitoring comprises the heartbeat monitor of the master HA process performing a first pinging of the HA processes on host computers other than the host computer hosting the master HA process, the first pinging being performed to detect the failed inter-host process or host computer; and
   the inter-host heartbeat monitoring further comprises the heartbeat monitor of each potential master HA process performing a second pinging of all other potential master HA processes in the list and the master HA process, the second pinging being performed to detect a failure of the master HA process and determine which potential master HA process replaces the master HA process if the master HA process has failed.

13. A method in accordance with claim 12, further comprising all the HA processes other than the master HA process monitoring other processes on each of their respective host computers.

* * * * *